(12) United States Patent
Meckes et al.

(10) Patent No.: US 6,935,593 B2
(45) Date of Patent: Aug. 30, 2005

(54) GAS DISTRIBUTION SYSTEM IN AN AIRPLANE

(75) Inventors: Rüdiger Meckes, Berkenthin (DE); Herbert Meier, Lübeck (DE); Wolfgang Rittner, Siblin (DE)

(73) Assignee: Dräger Aerospace GmbH, Lübeck (DE)

( * ) Notice: Subject to any disclaimer, the term of this patent is extended or adjusted under 35 U.S.C. 154(b) by 239 days.

(21) Appl. No.: 10/365,898

(22) Filed: Feb. 13, 2003

(65) Prior Publication Data

US 2003/0196696 A1 Oct. 23, 2003

(30) Foreign Application Priority Data

Apr. 19, 2002 (DE) .......................... 102 17 500

(51) Int. Cl.⁷ .............................................. B64D 11/00
(52) U.S. Cl. .................. 244/118.5; 137/110; 137/899.2
(58) Field of Search .............................. 137/110, 899.2; 244/129.1, 118.5

(56) References Cited

U.S. PATENT DOCUMENTS

| | | | |
|---|---|---|---|
| 2,934,293 A | 4/1960 | Boehme et al. | |
| 3,903,729 A | 9/1975 | Covington | ............... 73/40.5 R |
| 4,197,868 A | * 4/1980 | Carson | ................ 137/110 |
| 4,355,654 A | * 10/1982 | Levesque et al. | ........... 137/110 |
| 4,507,128 A | * 3/1985 | Werner | ................ 137/110 |
| 4,651,559 A | 3/1987 | Horigome et al. | ....... 73/40.5 R |

FOREIGN PATENT DOCUMENTS

| | | |
|---|---|---|
| DE | 195 31 916 A1 | 3/1997 |
| GB | 1 577 943 | 10/1980 |
| WO | WO 99/04858 | 2/1999 |

* cited by examiner

*Primary Examiner*—Stephen M. Hepperle
(74) *Attorney, Agent, or Firm*—McGlew and Tuttle, P.C.

(57) ABSTRACT

A gas distribution system in an airplane has improved reliability of operation with a first supply line (7) and a second supply line (9) for pressurized gas connected to a pressurized gas source (2) via a branching site (6) with a second shut-off valve (10). The pressure in the supply lines (7, 9) is determined with a pressure-measuring means (24). An evaluating device (24) for the measured pressure signal is provided for sending a closing signal to the shut-off valve (8, 10) of the supply line (7, 9) in which a pressure drop of consequence occurs.

16 Claims, 3 Drawing Sheets

US 6,935,593 B2

GAS DISTRIBUTION SYSTEM IN AN AIRPLANE

FIELD OF THE INVENTION

The present invention pertains to a gas distribution system in an airplane, especially for supplying passengers with oxygen.

BACKGROUND OF THE INVENTION

A device for supplying passengers and the crew with oxygen has become known from U.S. Pat. No. 2,934,293. Based on individual pressurized oxygen containers, which are connected to one another via a line system, the oxygen is sent into supply lines via pressure-reducing valves. The supply lines extending to the left and right of the rows of passengers are branched off from a distributor and are connected to emergency oxygen supply means, which are located next to the passenger seats. Supply lines for oxygen with separate pressure regulators are additionally provided for the pilots and the crew.

The prior-art gas distribution system in the area of the passenger rows has the drawback that total loss of oxygen occurs in case of damage to a supply line, e.g., due to turbine parts flying around, and the emergency oxygen supply units are no longer supplied with oxygen because of the pressure drop in the line system.

SUMMARY OF THE INVENTION

The basic object of the present invention is to improve a gas distribution system of the type mentioned in terms of its reliability of operation.

According to the invention, an airplane gas distribution system is provided with a branching site arranged downstream of a pressurized gas source for at least one first supply line and for a second supply line for pressurized gas. The first supply line is connected via a first shut-off valve to the branching site and the second supply line is connected to the branching site via a second shut-off valve. A pressure-measuring means is provided determining the pressure in the supply lines. An evaluating device for a measured pressure signal is designed to send a closing signal to the shut-off valve of the supply line causing a pressure drop.

The advantage of the present invention is essentially that by means of shut-off valves arranged in front of the individual supply lines as well as by measuring the pressure in the supply lines, the supply line in which a pressure drop was detected is isolated by means of the shut-off valve belonging to it. The device described in the present invention with two supply lines extending in parallel, which can be closed by means of a shut-off valve if necessary, is particularly suitable for installation in the so-called "engine burst area," which is located approximately in the middle of the airplane in the area of the wings and consequently in the vicinity of the engines.

Two supply lines for oxygen normally extend along the rows of passenger seats within the passenger compartment. It is advantageous here to perform a differential pressure measurement between the supply lines as the pressure measurement and to compare the differential pressure measured with a predetermined limit value in a downstream evaluating unit. The supply line in which the pressure drop occurred can be identified from the amplitude and the sign of the differential pressure, so that the corresponding shut-off valve is closed when a limit value is exceeded.

If the supply lines are connected to emergency oxygen supply means only, no appreciable differential pressure will appear between the supply lines during normal flight, because no gas is removed via the breathing masks located in the emergency oxygen supply means. When emergency oxygen supply means are activated, the differential pressure measurement offers the advantage that only the pressure difference between the individual supply lines is taken into consideration, because the absolute pressure may be subject to fluctuations as a consequence of the removal of gas via the oxygen masks. Since an approximately equal number of oxygen supply means and consequently breathing masks are connected to the supply lines extending in parallel in the area of the passengers, there is only a limited and essentially constant pressure difference between intact supply lines, and this pressure difference does not change substantially under stationary operating conditions. If a supply line is damaged, this can be immediately determined from a significant change in the differential pressure. The switching threshold for the differential pressure at which a closing signal is sent to the corresponding shut-off valve is advantageously between 50 mbar and 200 mbar.

A return line is advantageously connected to the free ends of the supply lines via nonreturn valves arranged in the opposite direction. The nonreturn valves are arranged in terms of the direction of flow such that flow of gas into the return line is possible from each of the supply lines, but not from the return line into one of the supply lines.

A third supply line for oxygen, with which another part of the passenger compartment can be supplied with oxygen, is advantageously connected to the return line.

If both the first supply line and the second supply line are intact, the third supply line receives its gas supply from the first supply line and from the second supply line via the nonreturn valves. If, e.g., a pressure drop occurs in the first supply line, the first shut-off valve closes and the gas supply for the third supply line takes place via the second nonreturn valve from the second supply line. Return of the gas into the damaged first supply line is prevented from occurring by the nonreturn valves.

Two pressure regulators, which operate independently from one another as altitude-controlled differential pressure regulators, are advantageously provided between the branching site and the pressurized gas source. The pressure profile of the pressure regulator rises linearly from 400 mbar to 6,800 mbar in the altitude range of 10,000 feet to 40,000 feet. Due to the parallel connection of the pressure regulators, the gas supply of the supply lines is also guaranteed in case of failure of one of the pressure regulators.

The reliability of operation of the gas distribution system described in the present invention is further enhanced by a doubly redundant pressure-limiting means. Two identical nonreturn valves are arranged in series in two lines connected in parallel such that flow can take place in each line in the same direction. This pressure-limiting means is located between the pressurized gas sources and the pressure regulators and is used to limit the admission pressure of the pressure regulator. Due to the partially parallel and serial arrangement of the nonreturn valves, the pressure-limiting function of the pressure-limiting means is ensured both in case of failure of one of the nonreturn valves and in case of failure of an individual nonreturn valve in each of the lines connected in parallel.

It was hitherto common practice in prior-art gas distribution systems with pressurized gas cylinders to provide separate pressure-limiting valves on the cylinder pressure reducers located on the pressurized gas cylinders. In light of a large number of pressurized gas cylinders, this also led to a need for a correspondingly large number of pressure-limiting valves, which may fail and must be maintained individually. The device described in the present invention has the advantage that only a single pressure-limiting means, which is designed as a doubly redundant pressure-limiting means and replaces the individual valves, is necessary for a battery of individual pressurized gas cylinders.

A shut-off valve located on a pressurized gas source is advantageously provided with a limit switch, which indicates the opening position of the valve. The limit switch is advantageously actuated with the handwheel of the shut-off valve. If the pressurized gas source is designed as an oxygen cylinder, the shut-off valve is the cylinder valve. The reliability of operation of the gas distribution system is further enhanced by the limit switch at the shut-off valve, because it can be determined at any time from a central control station whether the shut-off valve is indeed opened, because if gas is not being taken from the gas distribution system by any user, the pressure within the pipeline continues to be present with the shut-off valve closed, so that it is not yet possible to determine from a pressure indication alone whether the pressurized gas source is indeed also able to release gas into the gas distribution system when needed.

An exemplary embodiment of the present invention is shown in the drawings and will be explained in greater detail below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
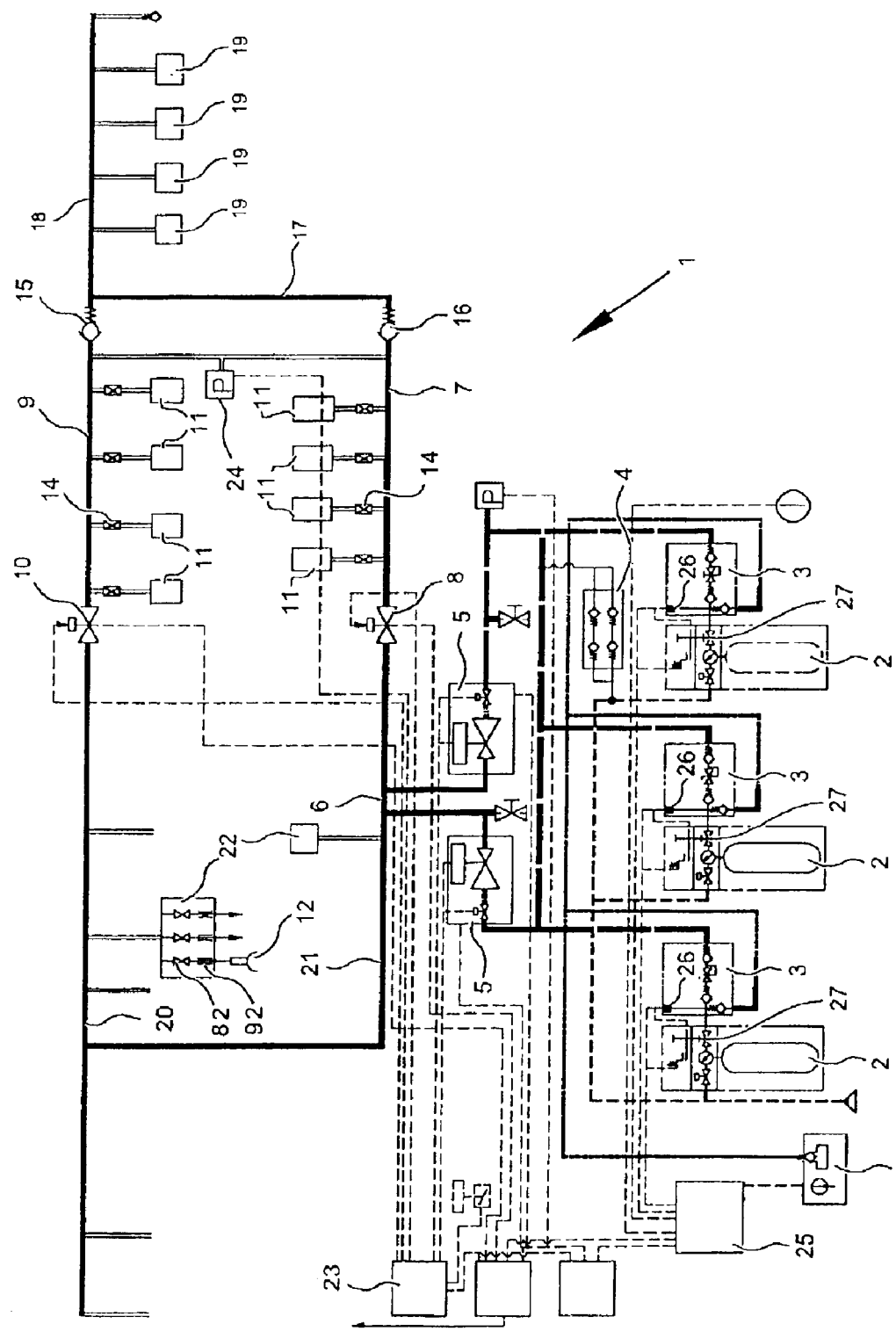
FIG. 1 is a schematic view showing a gas distribution system according to the present invention.

Referring to the drawings in particular, FIG. 1 schematically shows a gas distribution system 1 for oxygen in an airplane, which airplane is not shown specifically in FIG. 1, with three pressurized gas cylinders 2 for oxygen as the pressurized gas source and downstream cylinder pressure reducers 3, a pressure-limiting means 4, two pressure regulators 5 connected in parallel and a branching site 6, from which a first supply line 7 is supplied with oxygen via a first shut-off valve 8 and a second supply line 9 is supplied with oxygen via a second shut-off valve 10. Emergency oxygen supply means 11 with breathing masks 12 and flow-limiting valves 14 are located at the supply lines 7, 9. When the emergency oxygen supply means 11 are activated, the gas flow into the breathing masks 12 is also released via shut-off valves 82 and gas-metering means 92. The free ends of the supply lines 7, 9 are connected via a first nonreturn valve 16 and a second nonreturn valve 15 to a return line 17 and to a third supply line 18, at which emergency oxygen supply means 19 are likewise located.

A fourth supply line 20 and a fifth supply line 21, which likewise supply oxygen to emergency oxygen supply means 22, extend in the front part of the airplane, which is not specifically shown.

The first supply line 7 and the second supply line 9 are located at the level of the engines, i.e., at the level of the so-called "engine burst area."

An evaluating device 23 is connected to the shut-off valves 8, 10, the pressure regulators 5 as well as a pressure-measuring means 24 measuring the pressure between the supply lines 7, 9. A central computer unit 25, which performs all control and monitoring tasks, receives control and measured signals from the control means 24 and from limit switches 26, which are located at shut-off valves 27 of the pressurized gas cylinders 2.

The gas distribution system 1 described in the present invention operates as follows:

After the shut-off valves 27 at the pressurized gas cylinders 2 are opened, the central computer unit 25 receives the information via the limit switches 26 that the oxygen supply is ready to operate. Pressure is admitted to the supply lines 7, 9, 18, 20, 21 via the cylinder pressure reducers 3, the pressure regulators 5 and the branching site 6 in case of decompression of the cabin, so that the emergency oxygen supply means 11, 19, 22 are ready for use. The differential pressure between the first supply line 7 and the second supply line 9 is measured with the pressure-measuring means 24. The shut-off valves 8, 10 are also opened during normal operation. Thus, essentially the same pressure prevails in the supply lines 7, 9, 18, 20, 21, so that the evaluating device 23 receives the information from the pressure-measuring means 24 that there is no differential pressure. Even though a pressure drop will occur in the entire system due to the removal of gas when the emergency oxygen supply means 11, 19, 22 is switched on, no appreciable differential pressure is measured as yet between the supply lines 7, 9 because of the essentially equal number of breathing masks within the first supply line 7 and the second supply line 9.

If the first supply line 7 is damaged by an engine part flying around, which engine part is not shown in FIG. 1, in the area of the supply lines 7, 9, i.e., in the area of the "engine burst area," the pressure-measuring means 24 detects a differential pressure based on the escaping oxygen, and the evaluating device 23 determines that the limit value of the differential pressure has been exceeded. The switching threshold for sending a closing signal to the first shut-off valve 8 is in a range between about 50 mbar and 200 mbar. The third supply line 18 is supplied with gas in this case via the second supply line 9 and the second nonreturn valve 15. The nonreturn valves 15, 16 are arranged in opposite directions in relation to each other, so that gas can flow off only from the supply lines 7, 9 into the return line 17 but not in the opposite direction.

Thus, damage to one of the supply lines 7, 9 does not lead to total loss of gas, but the intact supply lines 9, 18, 20, 21 continue to be able to be supplied with oxygen. When the gas reserve in the pressurized gas cylinders 2 is depleted, these can be refilled via a central filling connection 13.

Figure 2:
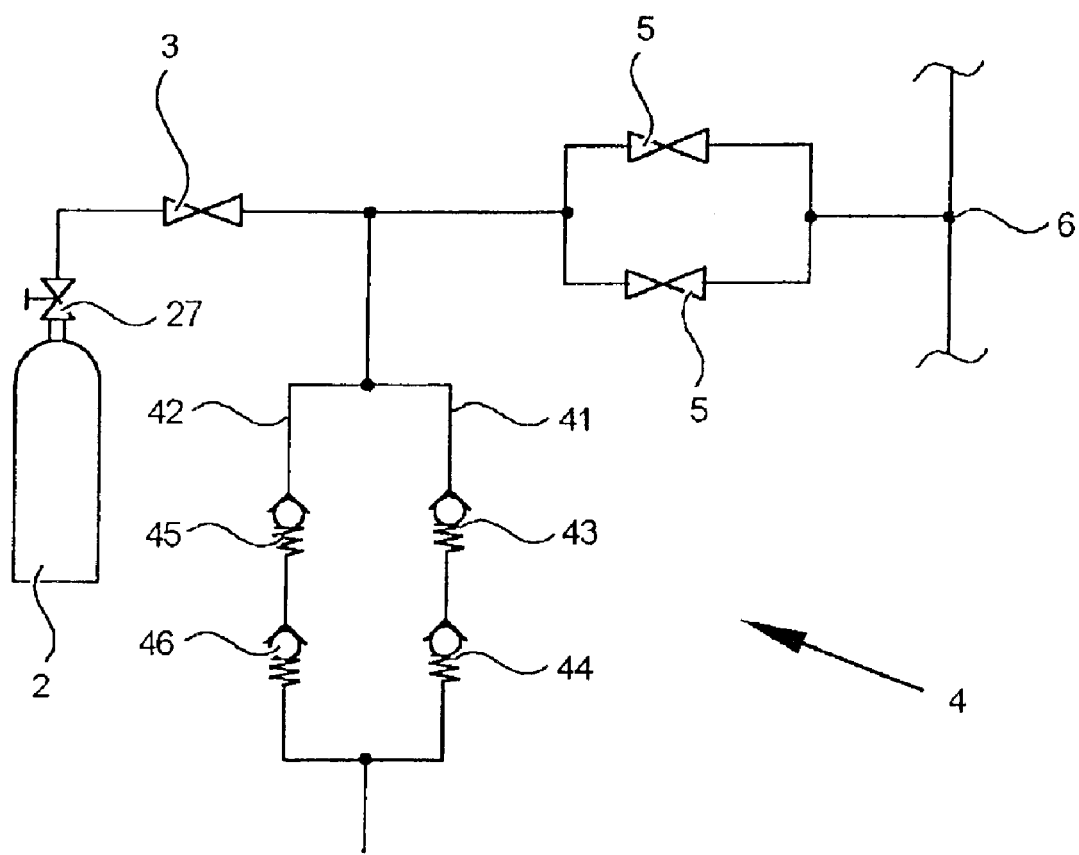
FIG. 2 is a doubly redundant pressure-limiting means.

FIG. 2 schematically illustrates the design of the pressure-limiting means 4 between the cylinder pressure reducers 3 and the pressure regulators 5. Nonreturn valves 43, 44 spring-loaded in the same direction are arranged in a first line 41, and a second line 42, which is connected in parallel to the first line 41, contains the nonreturn valves 45, 46. All nonreturn valves 43, 44, 45, 46 have the same opening pressure. If, e.g., jamming of the valve body occurs in the nonreturn valve 43, so that the valve cannot open, the overpressure is limited via the nonreturn valves 45, 46. If gas can flow freely through the nonreturn valve 43 as a consequence of a valve body jammed in the open position, the nonreturn valve 44 assumes the overpressure limitation. The overpressure limitation is also guaranteed via the remaining, intact nonreturn valves in case of failure of a nonreturn valve in one of the respective lines 41, 42. Besides the first case of error, the second case of error is also covered with the pressure-limiting means 4 described in the present invention.

Figure 3:
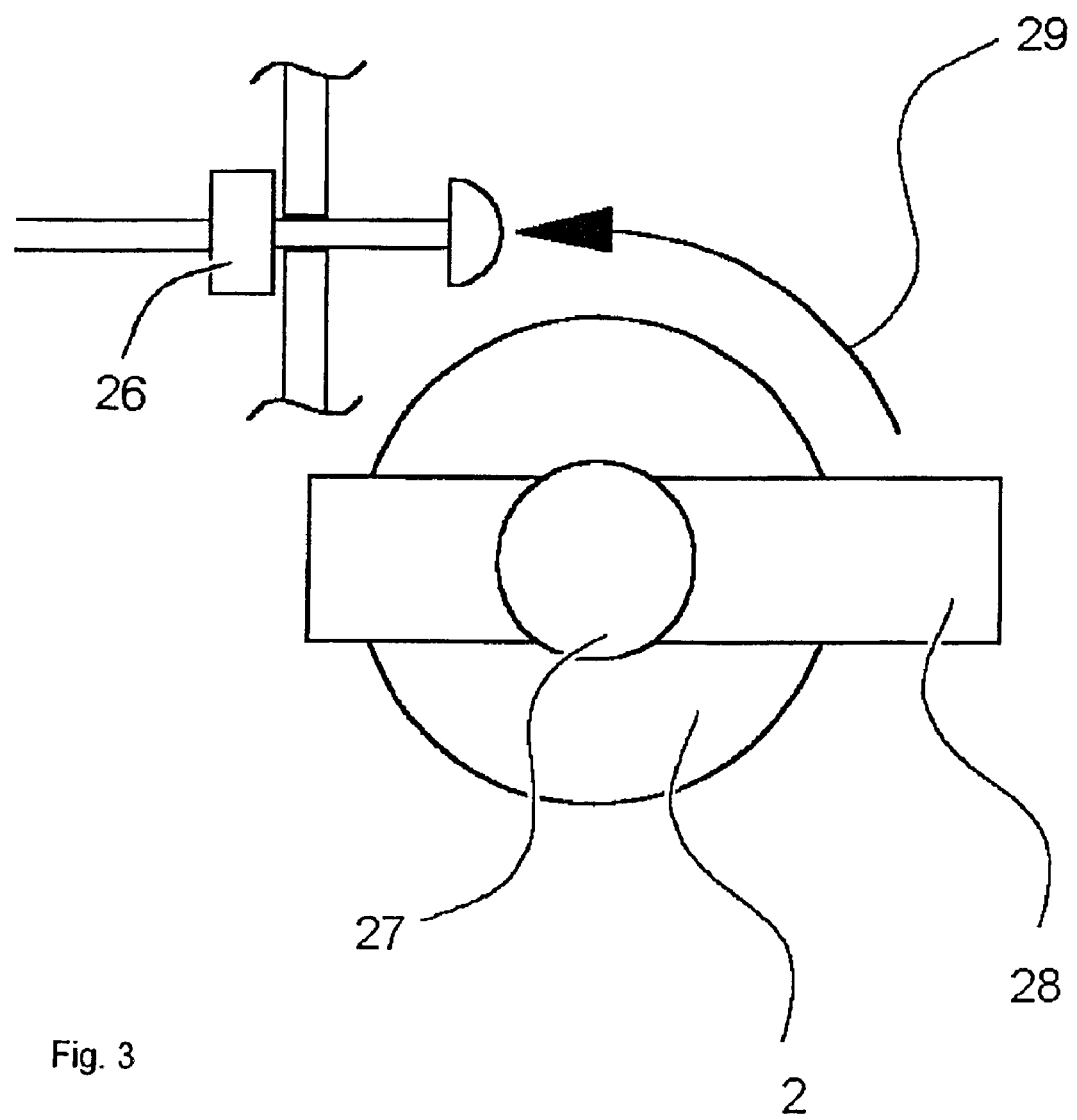
FIG. 3 is a shut-off device on a pressurized gas cylinder with a limit switch.

FIG. 3 schematically illustrates the shut-off valve 27 with a handwheel 28 on the pressurized gas cylinder 2. If the handwheel 28 is rotated in the direction of arrow 29 into the open position, the reaching of the end position is detected with the limit switch 26. The central computer unit 25, FIG. 1, receives the information via the limit switch 26 that the corresponding shut-off valve 27 has been opened.

While specific embodiments of the invention have been shown and described in detail to illustrate the application of the principles of the invention, it will be understood that the invention may be embodied otherwise without departing from such principles.

What is claimed is:

1. An airplane gas distribution system comprising:
   a pressurized gas source;
   a first supply line connected to a first set of passenger emergency oxygen supply means for supplying pressurized gas to passengers of the airplane;
   a second supply line connected to a second set of passenger emergency oxygen supply means for supplying pressurized gas to passengers of the airplane;
   a first shut-off valve;
   a second shut-off valve;
   a branching site arranged downstream of said pressurized gas source for said first supply line and for said second supply line, wherein said first supply line is connected via said first shut-off valve to said branching site and said second supply line is connected to said branching site via said second shut-off valve;
   a pressure-measuring means detecting and determining the differential pressure between pressures prevailing in said first and second supply lines; and
   an evaluating device for evaluating a measured pressure signal and for sending a closing signal to the shut-off valve of the supply line causing a pressure drop.

2. A gas distribution system in accordance with claim 1, wherein said evaluation device further comprises a means for analyzing an amplitude and a reading of positive or negative traits of said differential pressure.

3. A gas distribution system in accordance with claim 1, further comprising a return line connected to said first and second supply lines through a set of nonreturn valves arranged such that only gas flow from said first and second supply lines into said return line is made possible.

4. A gas distribution system in accordance with claim 3, wherein a third supply line is connected to said return line.

5. A gas distribution system comprising:
   a pressurized gas source;
   a first supply line for pressurized gas;
   a second supply line for pressurized gas;
   a first shut-off valve;
   a second shut-off valve;
   a branching site arranged downstream of said pressurized gas source for said first supply line and for said second supply line, wherein said first supply line is connected via said first shut-off valve to said branching site and said second supply line is connected to said branching site via said second shut-off valve;
   a pressure-measuring means detecting and determining the differential pressure between pressures prevailing in the supply lines;
   an evaluating device for evaluating a measured pressure signal and for sending a closing signal to the shut-off valve of the supply line causing a pressure drop; and
   a pressure regulator and a pressure-limiting means, said pressure regulator being upstream of said pressure-limiting means, said pressure regulator being disposed between said branching site and said pressurized gas source.

6. A gas distribution system in accordance with claim 5, wherein said pressure-limiting means comprises two lines connected in parallel each with two nonreturn valves arranged in the same direction in series.

7. A gas distribution system in accordance with claim 5, further comprising another pressure regulator connected in parallel with said pressure regulator.

8. A gas distribution system comprising:
   a pressurized gas source;
   a first supply line for pressurized gas;
   a second supply line for pressurized gas;
   a first shut-off valve;
   a second shut-off valve;
   a branching site arranged downstream of said pressurized gas source for said first supply line and for said second supply line, wherein said first supply line is connected via said first shut-off valve to said branching site and said second supply line is connected to said branching site via said second shut-off valve;
   a pressure-measuring means detecting and determining the differential pressure between pressures prevailing in the supply lines; and
   an evaluating device for evaluating a measured pressure signal and for sending a closing signal to the shut-off valve of the supply line causing pressure drop, wherein said pressurized gas source has a shut-off device with a limit switch for the detection of the opening position of said shut-off device.

9. An airplane gas distribution system comprising:
   a pressurized gas source;
   a first supply line connected to a first set of passenger emergency oxygen supply masks for supplying pressurized gas to a set of passengers;
   a second supply line connected to a second set of passenger emergency oxygen supply masks for supplying pressurized gas to the set of passengers;
   a first shut-off valve;
   a second shut-off valve;
   a branching site arranged downstream of said pressurized gas source for said first supply line and for said second supply line, wherein said first supply line is connected via said first shut-off valve to said branching site and said second supply line is connected to said branching site via said second shut-off valve;
   a pressure-measuring means detecting and determining the differential pressure between pressures prevailing in said first supply line and in said second supply line; and an evaluating device for evaluating a signal based on the pressure prevailing in said first supply line and in said second supply line and for sending a closing signal to said shut-off valve of said first supply line should said second supply line have a diminished prevailing pressure.

10. A gas distribution system in accordance with claim 9, wherein said evaluation device further comprises a means for analyzing an amplitude and a positive or negative traits of said differential pressure.

11. A gas distribution system in accordance with claim 9, further comprising a return line connected to said first and second supply lines through nonreturn valves arranged such that only gas flow from said first and second supply lines into said return line is made possible.

12. A gas distribution system in accordance with claim 11, wherein a third supply line is connected to said return line.

13. A gas distribution system comprising:
- a pressurized gas source;
- a first supply line for pressurized gas;
- a second supply line for pressurized gas;
- a first shut-off valve;
- a second shut-off valve;
- a branching site arranged downstream of said pressurized gas source for said first supply line and for said second supply line, wherein said first supply line is connected via said first shut-off valve to said branching site and said second supply line is connected to said branching site via said second shut-off valve;
- a pressure-measuring means detecting and determining the differential pressure between pressures prevailing in said first supply line and in said second supply line; and
- an evaluating device for evaluating a signal based on the pressure prevailing in said first supply line and in said second supply line and for sending a closing signal to the shut-off valve of said first supply line should said second supply line have a diminished prevailing pressure; and
- a pressure regulator and a pressure-limiting means, said pressure regulator being upstream of said pressure-limiting means, said pressure regulator being disposed between said branching site and said pressurized gas source.

14. A gas distribution system in accordance with claim 13, wherein said pressure-limiting means comprises two lines connected in parallel each with two nonreturn valves arranged in the same direction in series.

15. A gas distribution system in accordance with claim 13, further comprising another pressure regulator connected in parallel with said pressure regulator.

16. A gas distribution system comprising:
- a pressurized gas source;
- a first supply line for pressurized gas;
- a second supply line for pressurized gas;
- a first shut-off valve;
- a second shut-off valve;
- a branching site arranged downstream of said pressurized gas source for said first supply line and for said second supply line, wherein said first supply line is connected via said first shut-off valve to said branching site and said second supply line is connected to said branching site via said second shut-off valve;
- a pressure-measuring means detecting and determining the differential pressure between pressures prevailing in said first supply line and in said second supply line; and
- an evaluating device for evaluating a signal based on the pressure prevailing in said first supply line and in said second supply line and for sending a closing signal to the shut-off valve of said first supply line should said second supply line have a diminished prevailing pressure, wherein said pressurized gas source has a shut-off device with a limit switch for the detection of the opening position of said shut-off device.

* * * * *